(12) United States Patent
Tuerk (10) Patent No.: US 10,483,790 B2
(45) Date of Patent: Nov. 19, 2019

(54) SYSTEM AND METHOD FOR CHARGING AUTONOMOUSLY POWERED DEVICES USING VARIABLE POWER SOURCE

(71) Applicant: CLEAR BLUE TECHNOLOGIES INC., Toronto (CA)

(72) Inventor: John Tuerk, Toronto (CA)

( * ) Notice: Subject to any disclaimer, the term of this patent is extended or adjusted under 35 U.S.C. 154(b) by 105 days.

(21) Appl. No.: 15/735,973

(22) PCT Filed: Jun. 20, 2016

(86) PCT No.: PCT/CA2016/000172
§ 371 (c)(1),
(2) Date: Dec. 13, 2017

(87) PCT Pub. No.: WO2016/205921
PCT Pub. Date: Dec. 29, 2016

(65) Prior Publication Data
US 2018/0175661 A1    Jun. 21, 2018

Related U.S. Application Data

(60) Provisional application No. 62/185,156, filed on Jun. 26, 2015.

(51) Int. Cl.
*H02J 7/00* (2006.01)
*H02J 7/35* (2006.01)
(Continued)

(52) U.S. Cl.
CPC ............ *H02J 7/35* (2013.01); *E04H 12/2261* (2013.01); *E04H 12/24* (2013.01); *H02J 7/00* (2013.01);
(Continued)

(58) Field of Classification Search
CPC .... H02J 7/0077; H02J 7/04; H02J 7/00; H02J 7/35; H05B 37/0218; H05B 37/0272;
(Continued)

(56) References Cited

U.S. PATENT DOCUMENTS 4,481,562 A  *  11/1984  Hickson ................. F21S 9/032
                                                                362/183
5,530,335 A  *   6/1996  Decker ..................... G05F 1/67
                                                                136/293
(Continued)

OTHER PUBLICATIONS

International Search Report (prepared in respect of PCT/CA2016/000172), dated Dec. 29, 2016.
(Continued)

*Primary Examiner* — Robert Grant
*Assistant Examiner* — John T Trischler (57) ABSTRACT

A solar or self-powered assembly includes a rechargeable battery and photo voltaic panel and/or wind turbine for supplying a battery charging current. A charge controller processor is controls charging current from the photovoltaic panel and/or wind turbine to maintain the battery in a substantially fully charged state of 80% or more state of charge over daily charge and discharge cycle charging is based on a projected target energy input based on the initial bulk energy charge, the level of discharge required to compensate for charging inefficiencies and the battery capacity factor representative of the projected natural charge in the battery over its lifespan.

20 Claims, 8 Drawing Sheets

(51) Int. Cl.

| | | |
|---|---|---|
| *H02J 7/04* | (2006.01) | |
| *E04H 12/22* | (2006.01) | |
| *E04H 12/24* | (2006.01) | |
| *H05B 37/02* | (2006.01) | |
| *H02S 10/20* | (2014.01) | |
| *H02S 10/12* | (2014.01) | |
| *F21S 8/08* | (2006.01) | |
| *F21S 9/03* | (2006.01) | |
| *F21S 9/04* | (2006.01) | |

(52) U.S. Cl.
CPC .............. *H02J 7/0077* (2013.01); *H02J 7/04* (2013.01); *H02S 10/12* (2014.12); *H02S 10/20* (2014.12); *H05B 37/02* (2013.01); *H05B 37/0218* (2013.01); *H05B 37/0272* (2013.01); *F21S 8/086* (2013.01); *F21S 9/035* (2013.01); *F21S 9/043* (2013.01); *Y02B 20/46* (2013.01); *Y02E 10/766* (2013.01)

(58) Field of Classification Search
CPC ..... H05B 37/02; E04H 12/2261; E04H 12/24; H02S 10/20; H02S 10/12
USPC .......................................................... 320/101
See application file for complete search history.

(56) References Cited

U.S. PATENT DOCUMENTS

| | | | | |
|---|---|---|---|---|
| 5,570,000 | A * | 10/1996 | Kowalski | F21S 8/033 136/291 |
| 5,691,078 | A | 11/1997 | Kozaki | |
| 7,988,320 | B2 * | 8/2011 | Brumels | F21S 8/086 248/299.1 |
| 8,040,102 | B2 * | 10/2011 | Kao | F21S 8/086 136/291 |
| 8,076,907 | B2 * | 12/2011 | Ngosi | H02J 7/35 320/160 |
| 8,616,721 | B1 * | 12/2013 | Woodall, Jr. | F21V 33/006 135/88.11 |
| 8,678,607 | B2 * | 3/2014 | Anderson | F21L 4/08 362/183 |
| 8,733,965 | B2 * | 5/2014 | Chan | F21S 9/032 362/183 |
| 8,841,884 | B2 * | 9/2014 | Bourbeau | H02J 7/0091 320/132 |
| 9,800,085 | B2 * | 10/2017 | Kim | H02J 7/35 |
| 9,920,895 | B2 * | 3/2018 | Diamond | F21S 8/085 |
| 9,970,612 | B2 * | 5/2018 | Soofer | F21S 9/035 |
| 2010/0033124 | A1 | 2/2010 | Ngois et al. | |
| 2011/0140672 | A1 | 6/2011 | Bourbeau et al. | |
| 2011/0228520 | A1 * | 9/2011 | Cumberland | F21S 9/026 362/183 |
| 2011/0305010 | A1 * | 12/2011 | Leadford | F21S 9/035 362/183 |
| 2012/0143383 | A1 * | 6/2012 | Cooperrider | H04Q 9/00 700/295 |
| 2014/0176043 | A1 * | 6/2014 | Fujiyama | H02J 7/0052 320/101 |
| 2014/0204568 | A1 * | 7/2014 | Anderson | F21L 4/08 362/183 |
| 2015/0162867 | A1 * | 6/2015 | Meringer | H02S 20/20 362/183 |
| 2016/0204649 | A1 * | 7/2016 | Kim | H02J 7/35 320/101 |

OTHER PUBLICATIONS

"Comparison of battery charging algorithms for stand alone photovoltaic systems", Armstrong et al., 2008 IEEE Power Electronics Specialists Conference. 2008, p. 1469-1475, 7p.

IPRP (prepared in respect of PCT/CA2016/000172), Dec. 29, 2016.

* cited by examiner

SYSTEM AND METHOD FOR CHARGING AUTONOMOUSLY POWERED DEVICES USING VARIABLE POWER SOURCE

RELATED APPLICATIONS

This application claims priority and the benefit of 35 USC § 119(e) to U.S. patent application Ser. No. 62/185156, filed 26 Jun. 2015.

SCOPE OF THE INVENTION

The present invention relates to self or solar powered light installations, and more particularly autonomously powered installations which incorporate a rechargeable battery and a power generator such as a photovoltaic cell or panel and/or wind turbine for generating battery charging energy.

BACKGROUND OF THE INVENTION

The use of photovoltaic cells or solar panels to power autonomously powered devices such as solar powered light poles, highway and street signs, bike rental installations, parking meters, and the like, are achieving more widespread acceptance in the marketplace. Such autonomously powered devices are typically provid a rechargeable battery which stores and supplies electrical power to load devices, such as LED lights, cameras and communication systems. A generation system is provided which is selected to produce and autonomously supply a charging electric current to the battery. Conventionally, autonomously powered devices are typically provided with a solar panel consisting of one or more photovoltaic cells and/or a wind turbine for use in generating electric power.

Heretofore, battery performance and reliability has proven a major impediment to the widespread commercial acceptance of self or autonomously powered light poles, traffic and street signs, parking meters and the like. In particular, by virtue of the varying nature of available sunlight and/or wind to power solar panels and wind turbines, the power generation system associated with conventional solar lights suffer disadvantages respecting reliably and/or fully charging, or overcharging device batteries.

SUMMARY OF THE INVENTION

Accordingly, the present invention seeks to provide an improved solar, wind or other limited or low current powered device, such as a solar powered light pole, traffic or highway sign, parking meter, pump, car or bike charging stand, security camera, electric fence, alarm, or the like (hereinafter collectively referred to as autonomously powered device), which incorporates a rechargeable battery for supplying electrical power to one or more device loads. A charge controller is further provided to control or regulate charging power to the battery to maximize the supply of variable charging power to the battery to maintain the battery at a substantially 100% state of charge during charging cycles, as well as limit detrimental overcharging.

Another object of the invention is to provide a solar light assembly or other assembly for an autonomously powered device which includes a rechargeable battery, multi-cell battery together with a photovoltaic panel and/or wind turbine for supplying a charging current thereto. The photovoltaic panel and turbine are operable to supply a charging current to the battery which is variable depending upon the season and/or current weather with changes in wind speeds, cloud cover, sun intensity and the like, and which typically ranges between 0 to 30 amps, and typically 15 to 25 amps. The system further includes a charge controller and microprocessor or processing assembly (hereinafter collectively referred to as a central processing unit) (CPU) which is operable in conjunction with program instructions to control the flow of charging current from the photovoltaic panel and/or wind turbine to maintain the battery in a substantially fully charged state of at least 50%, preferably at least 70% to 80% state of charge, and most preferably about a 100% state of charge, over a daily charge and discharge cycle.

In a most preferred embodiment, the rechargeable battery is a multi-cell, and typically a six cell deep cycle lead acid battery. It is to be appreciated, however, that other types of rechargeable batteries including without restriction nickel metal hydride, lithium ion, and lithium ion polymer batteries may also be used.

The applicant has appreciated that some of the challenges and/or conditions which effect charging of batteries in an off-grid or autonomously powered systems that, for example, may be also installed in outdoor enclosures include:

wide range of operating temperatures for both seasonal and daily;
the input energy sources having fluctuating power outputs that can change with seasonal changes such as;
  wind levels and patterns;
  angle of sun relative to the panels;
  hours of sun;
  operating temperatures of the panels and batteries;
daily weather effects such as:
  cloud effect available energy;
  wind variability effect available energy;
  snow build up on panels;
  dust build up on panels;
installed site effects such as:
  shading by trees, power lines and many other possible obstructions;
  trees, buildings and other local obstructions will drastically effect wind energy resources;
  installation variations such as solar panel orientation of OEM designs that result in unexpected self shading effects;
  battery enclosures and their location will also drastically effect the normal operating temperatures both day and night time which effects the battery's acceptance of the available energy sources, as well as its short term and long term available capacity.

Typical batteries, such as lead acid battery manufacturer's recommended charge profiles assume a grid connection that provides reliable, stable and ample energy supply. For this reason, the applicant has recognized a differing charging approach is required for an outdoor off-grid power application. Preferably, for solar and/or wind powered devices modified charging procedures may be adapted based, at least in part, on one or more of the following application assumptions.

As one possible starting point, a suitable rechargeable battery, such as lead acid battery that is at 100% state of charge [SOC] is chosen at a given operating temperature [$T_{OP}$]. For intended purposes, it is assumed the battery is charged during the day as part of a charging cycle, and discharged at night by used energy ($AH_{discharge}$).

Off-grid systems are preferably designed with a large battery capacity versus the available input energy sources. A typical installation preferably has battery capacity [$B_{cap}$] capable of supporting the normal daily device load for up to 3 to 5 days. This translates into a typical one day discharge of approximately 20% depth of discharge (DOD) or less.

The typical battery manufacturers will specify that the total amount of energy required to recharge the battery is chosen at 105% to 120% of the discharged energy ($AH_{discharge}$), and which may be represented by $O_c$ %.

At the commencement of charging, an initial "Bulk Charge" stage for charging the device battery of a charge profile is selected, whereby battery charge efficiency/acceptance is approximately 100%. Given the difference in typical solar panel charging capacity versus battery storage capacity, the maximum recommended charging current will never be reached during the Bulk Charge using most one to three photovoltaic panels generation systems for charging power generation, eliminating the need for active current limiting.

Once the battery first reaches a temperature dependent target absorption charge voltage ($V_{AB}[T]$), the battery maybe assumed to be at approximately 80% state of charge (SOC). This thus suggests that a minimum of 20% of the battery capacity [$B_{cap}$] is still required to reach 100% SOC.

If battery acceptance was 100% efficient, regardless of a particular battery charging discharge stage, then the total energy removed would be equal to the input energy into the battery during the Bulk Charge stage, plus the remaining 20% of battery capacity as follows:

$$AH_{discharge} = AH_{bulk} + 20\% \times B_{cap}$$

Most manufacturers recognize that during charging, a second or Absorption Stage of the battery charge profile is not 100% efficient, and that the battery will exhibit an effective resistance to charge increases, resulting in losses. These losses are compensated for with a maximum overcharge capacity value $O_c$ %. The resulting theoretical formula can then be written to describe a charging cycle which includes an ideal total first and second stage charge energy return:

$$\text{total } AH \text{ to fully charge battery} = O_c \% (AH_{bulk} + 20\% \times B_{cap}) = O_c \% \times AH_{bulk} + O_c \% \times 20\% \times B_{cap}$$

This formula is most reliable where the battery DOD is ≥20%, and it assumes that even when applying a low or variable input charging current at the beginning of charging, that the battery voltage would immediately reach the target voltage $V_{AB}[T]$. Where, however, the DOD <20% and/or low current charging does not immediately impact the battery voltage may tend to fail to reach $V_{AB}[T]$.

It has been seen by experimentation that even with a battery at <20% DOD or even 0%, $AH_{bulk}$ will never be 0. The natural available energy (i.e. starting at dawn for photovoltaic generation systems) provides a natural graduation of the produced energy which is considered to be a gentle refresh charge. On the other hand the $O_c \% \times 20\% \times B_{cap}$ is an unwanted overcharge for these low DOD situations.

When designing an off grid system, the maximum battery discharge is preferably limited to 60% of the battery capacity. This then translates into a maximum expected $AH_{bulk} = 60\% \times B_{cap} - 20\% \times B_{cap} = 40\% \times B_{cap}$.

The overcharge potential of the $O_c \% \times 20\% \times B_{cap}$ when the actual DOD is less than 20%, needs to be minimized during this event.

Realizing that in practice $AH_{bulk}$ is typically 20% to 60% $B_{cap}$, preferably <40%×$B_{cap}$, the ratio $AH_{bulk}/40\% B_{cap}$ is selected to minimize the overcharge effect of $O_c \% \times 20\% \times B_{cap}$.

In a preferred mode, starting with the formula meant of >20% DOD.

$$AH_{bulk} + AH_{absorption} = O_c \% \times (AH_{bulk} + 20\% B_{cap})$$

or $$AH_{absorption} = O_c \% \times (AH_{bulk} + 20\% B_{cap}) - AH_{bulk}$$

A minimizing effect $AH_{bulk}/(40\% \times B_{cap})$ is incorporated to the $O_c \% \times 20\% \times B_{cap}$ part of the equation to reduce its impact:

$$AH_{absorption} = O_c \% \times (AH_{bulk} + 20\% \times B_{cap} \times AH_{bulk}/(40\% \times B_{cap})) - AH_{bulk}$$

As such, the equation may be simplified:

$$AH_{absorption} = AH_{bulk} \times (1.5 \times O_c \% - 1)$$

By using the normal system design criteria, the operating characteristics of the variable energy sources of off-grid systems and combining it with optimized battery (i.e. lead acid battery) charging objectives, self adaptive charging may be achieved to varying levels of DOD. The charging formula is also independent of battery capacity or the size of the input variable energy source, within normal design practices.

As batteries are cycled and exposed to extreme temperatures, the battery capacity $B_{cap}$ will gradually be reduced. This predicated determination can be relied upon to determine a battery capacity factor $F_B$. For example, the typical life cycle of a battery can start at 100% $B_{cap}$ and increase over initial use to 120% and then down to 50% which is considered end of life. On top of this normal batter usage, the battery capacity for expected discharge capacity is also effected by its operating temperature ($T_{OP}$) giving us $F_B[T]$.

For off-grid solar light installations the daily energy consumption represents a predictable level of DOD that was based on a battery's 100% $B_{cap}$. In reality., as the battery is used, the effective capacity is reduced resulting in a higher DOD. For this reason, it is advantageous to add another variable to the equation which can be changed over the life of the battery. This variable $F_B$ will have a range of 50% to 110% and has been added to the charging formula as follows:

$$AH_{absorption} = AH_{bulk} \times (1.5 \times F_B \times O_c \% - 1)$$

Accordingly, the present invention provides a number of non-limiting aspects, and which include without restriction:
1. A solar light or other autonomously powered assembly comprising: solar light pole and/or other load bearing device including, a rechargeable battery, a light electrically communicating connected to said battery, photovoltaic panel for supplying a charging current to said battery, and a charge controller operable to sense a level of a depth of discharge (DOD) and/or a state of charge (SOC) of said battery and regulate or control a flow of charging current from the photovoltaic panel to the battery, a processing assembly communicating with said charge controller and operable to receive input signals representative of said sensed level of DOD and/or SOC, and to output in response thereto controller control signals for controlling the flow of said charging current, the processing assembly including memory and program instructions, wherein, the memory periodically receiving initial input values representative of an estimated initial battery capacity factor $F_B$ for said battery, and a preselected battery target voltage $V_{AB}$ at a selected operating temperature ($T_{selected}$), wherein as part of a daily charging and discharge cycle the program instructions being operable whereby, during an initial charge period:

A. receiving into said memory an initial bulk energy charge ($AH_{bulk}$) representative of cumulative charging current over time required to charge said battery to said preselected battery target voltage ($V_{AB}$);

A. calculate a target energy input ($AH_{projected}$) selected as a projected required amperage per period of time for said battery to achieve a substantially 100% state or charge, wherein said target energy input ($AH_{projected}$) is determined by the formula:

$$(AH_{projected}) = (AH_{bulk})(K \times F_B \times O_c\% - 1)$$

wherein K is a constant selected at between about 1 and 2, and preferably abotit 1.5, $F_B$ [T] is selected at between 50% to 100% and $O_c$ is a maximum overcharge capacity value selected at between 100% and 120%;

C. following the initial charging period, the processing assembly outputting control signals to said charge controller to effect a second stage charging period and regulate the flow of said charging current into said battery as a first intermittent current flow, the first intermittent current flow characterized by sequential current charging periods selected to substantially maintain said battery at said preselected battery target voltage ($V_{AB}$) calculating and inputting into said memory an absorption energy charge ($AH_{Ab}$) representative of cumulative charging energy into said battery;

D. when the cumulative charging energy ($AH_{Ab}$) equals the target energy input ($AH_{projected}$), outputting control signals to said charge controller to regulate the flow of charging current to said battery as a second intermittent current flow, the second intermittent current characterized by sequential current charging periods selected to maintain said charge to said battery at a target float voltage ($V_{float}$) selected to substantially maintain the battery at a substantially 100% state of charge.

2. An autonomously powered load or solar light assembly comprising: a plurality of loads and/or light poles disposed in an array at first geographic locations, each said load or light pole including, a rechargeable battery, a load, such as a solar light electrically communicating with said battery, a power generator including at least one of a photovoltaic cell and a wind turbine for supplying a charging current to said battery, said charging current comprising a variable current ranging between 0 and 20 amperes, a charge controller operable to sense a level of a depth of discharge (DOD) and/or state of charge (SOC) of said battery and regulate or control a flow of charging current from the power generator to the battery, a processing assembly communicating with said charge controller and operable to receive input signals representative of said sensed level of DOD and/or SOC, and to output in response thereto controller control signals for controlling the flow of said charging current, the processing assembly including memory and program instructions and wherein, the memory receiving initial input values representative of an estimated initial battery capacity factor $F_B$ for said battery, and a preselected battery target voltage $V_{AB}$ at a selected operating temperature ($T_{OP}$), the program instructions operable whereby, during an initial charge period:

A. receiving into said memory an initial bulk energy charge ($AH_{bulk}$) representative of cumulative charging current over time required to charge said battery to said preselected battery target voltage ($V_{AB}$);

A. calculate a target energy input ($AH_{projected}$) selected as a projected required amperage per period of time for said battery to achieve. a substantially 100% state of charge, wherein said target energy input ($AH_{projected}$) is determined by the formula:

$$(AH_{projected}) = (AH_{bulk})(K \times F_B \times O_c\% - 1)$$

wherein K, is a constant selected at between about 1 and 2, and pmferably about 1.5, $F_B$ is selected at between 40% to 100%, preferably 50% to 100%; and $O_c$ is a maximum overcharge capacity value selected at between 100 and 120%;

C. following the initial charging period, the processing assembly outputting control signals to said charge controller to effect a second stage charging period and regulate the flow of said charging current into said battery as a first intermittent current flow, the first intermittent current flow characterized by sequential current charging periods selected to substantially maintain said battery at said preselected battery target voltage ($V_{AB}$) calculating and inputting into said memory an absorption energy charge ($AH_{ab}$) representative of cumulative charging energy into said battery.

An assembly in accordance with any of the preceding or hereafter described aspects, wherein the charging current comprises a variable current ranging between about 0 up to 30 amperes, and preferably about 15 to 20 amperes.

An assembly in accordance with any of the preceding or hereafter described aspects, wherein the rechargeable battery comprises deep cycle lead acid battery comprising a plurality of cells.

An assembly in accordance with any of the preceding or hereafter described aspects, wherein said light pole is disposed in a geographic location remote from said processing assembly, said light pole further comprising a data transmission assembly electronically communicating with said charge controller, the data transmission assembly being operable to transmit said input signals to said processing assembly and for receiving said controller control signals therefrom.

An assembly in accordance with any of the preceding or hereafter described aspects, wherein said data transmission assembly comprises a wireless transmission assembly.

An assembly in accordance with any of the preceding or hereafter described aspects, wherein the estimated initial battery capacity factor is selected at from 50% to 100%.

An assembly in accordance with any of the preceding or hereafter described aspects, wherein the preselected target battery voltage ($V_{AB}$) is selected in the range of about 2.0 to 2.7, and preferably 2.4 to 2.5 volts per battery cell.

An assembly in accordance with any of the preceding or hereafter described aspects, wherein the light pole further comprises a temperature sensor for sensing an approximate temperature of said battery, said data transmission assembly being operable to transmit data representative of said sensed temperature to said processing assembly.

An assembly in accordance with any of the preceding or hereafter described aspects, wherein the first intermittent current flow comprises a pulsed current flow having charging pulse width frequency selected at between about ¼ second and 90 seconds and preferably 1 to 10 seconds.

An assembly in accordance with any of the preceding or hereafter described aspects, wherein during said second stage charging, the processing assembly dynamically selecting an adjusted battery target voltage ($V_{AB}$[T]) per battery cell as a temperature compensated voltage in accordance with the formula:

$$V_{AB}[T] = V_{AB} \times S_n + (C_F)_1 \times S_n \times (T_1 - T_{OP})$$

where $(C_F)_1$ is a compensating factor selected at between −0.001 to −0.01 where $S_n$ represent the # of cells is said battery.

An assembly in accordance with any of the preceding or hereafter described aspects, wherein during charging of said battery with said second intermittent current, substantially outputting to said memory data representative of said battery voltage, temperature, and accumulated AH.

An assembly in accordance with any of the preceding or hereafter described aspects, wherein during said first intermittent current flow, on detecting said pulsed current frequency being less than about 2 seconds, and preferably about 1 second, measuring minimum and maximum battery voltages, and outputting control signals indicative of a substantially 100% battery charge condition.

An assembly in accordance with any of the preceding or hereafter described aspects, wherein the battery capacity factor ($F_B$) is calculated in a direct linear relation to at least one of an age of the battery and a charging/discharge frequency of the battery and/or one or more previously installed batteries.

An assembly in accordance with any of the preceding or hereafter described aspects, wherein the initial battery capacity factor ($F_B$) further is calculated on a historical discharge and recharge performance of said battery.

An assembly in accordance with any of the preceding or hereafter described aspects, wherein when the cumulative charging energy ($AH_{Ab}$) equals the target energy input ($AH_{projected}$), the processing assembly outputting control signals to said charge controller to regulate the flow of charging current to said battery as a second intermittent current flow, the second intermittent current characterized by sequential current charging periods selected to maintain said charge to said battery at a target float voltage ($V_{float}$) selected to substantially maintain the battery at a substantially 100% state of charge.

$$V_{float}[T] = V_{FL} \times S_n + (C_F)_2 \times S_n (T_1 - T_{OP})$$

An assembly in accordance with any of the preceding or hereafter described aspects, wherein K is selected at between about 1.2 and 1.7, and preferably at about 1.5.

An assembly in accordance with any of the preceding or hereafter described aspects, wherein if during the initial charge period, $AH_{projected}$ is not reached, during said discharge period the processing assembly sending control signals to said solar light pole to activate said light as a load, and wherein the charge controller being operable to deactivate the light on sensing a predetermined threshold maximum level of battery depth of discharge.

An assembly in accordance with any of the preceding or hereafter described aspects, wherein following said second stage charging, the control processing unit being operable to send control signals to the charge controller to effect monitoring of battery amp-hour discharge ($AH_{discharge}$) up to a next said initial charging period.

An assembly in accordance with any of the preceding or hereafter described aspects, wherein the charge controller being operable to output to the processing assembly, the total said amp-hour discharge ($AH_{discharge}$), the processing assembly operable to calculate a next total energy input ($AH_{projected-next}$) in accordance with:

$$AH_{projected-next} = AH_{discharge} \times O_c \% - AH_{bulk}$$

BRIEF DESCRIPTION OF THE DRAWINGS

Reference may now be had to the following detailed description, taken together with accompanying drawings in which.

DETAILED DESCRIPTION OF THE PREFERRED EMBODIMENTS

Figure 1:
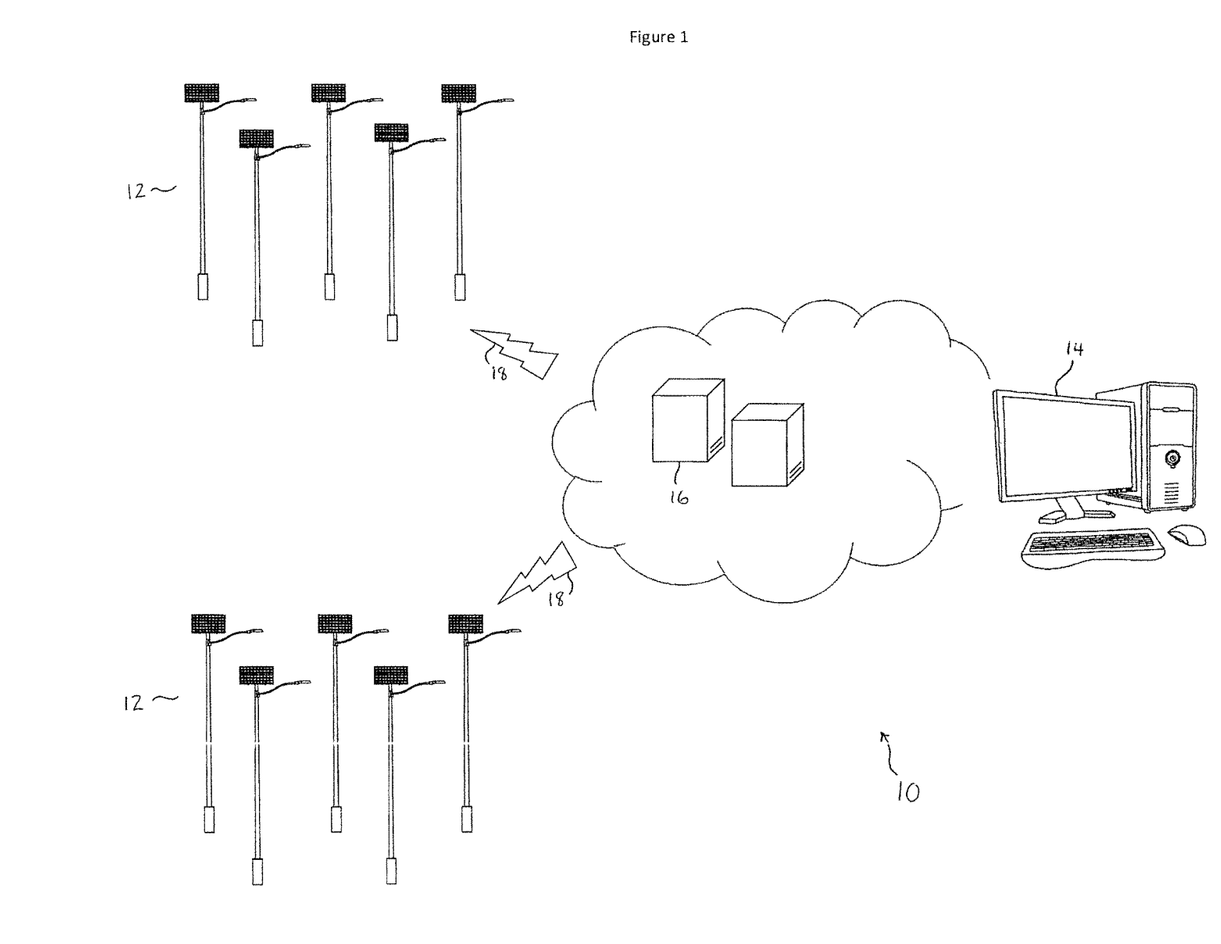
FIG. 1 illustrates schematically a solar light installation in accordance with a preferred embodiment of the invention.

FIG. 1 illustrates schematically a solar light pole installation 10 in accordance with a preferred embodiment of the invention. The installation 10 includes an array of solar light poles 12, a centrally located processing unit (CPU) 14 and a data storage repository 16.

As will be described, the CPU 14 is provided with memory together with software and/or stored program instructions for receiving operational data signals from and providing control signals to the light pole array 12 and/or data storage repository 16. The light pole array 12 is typically located in a geographic location which is remote from, and which for example may be several kilometers to several thousand kilometers away from the central processing unit 14. The light pole array 12, central processing unit 14 and data storage repository 16 are provided in electronic communication with each other, and most preferably electronically communicating by one or more of the Internet, cellular WiFi, or other ZigBee communication networks 18.

Figure 2:
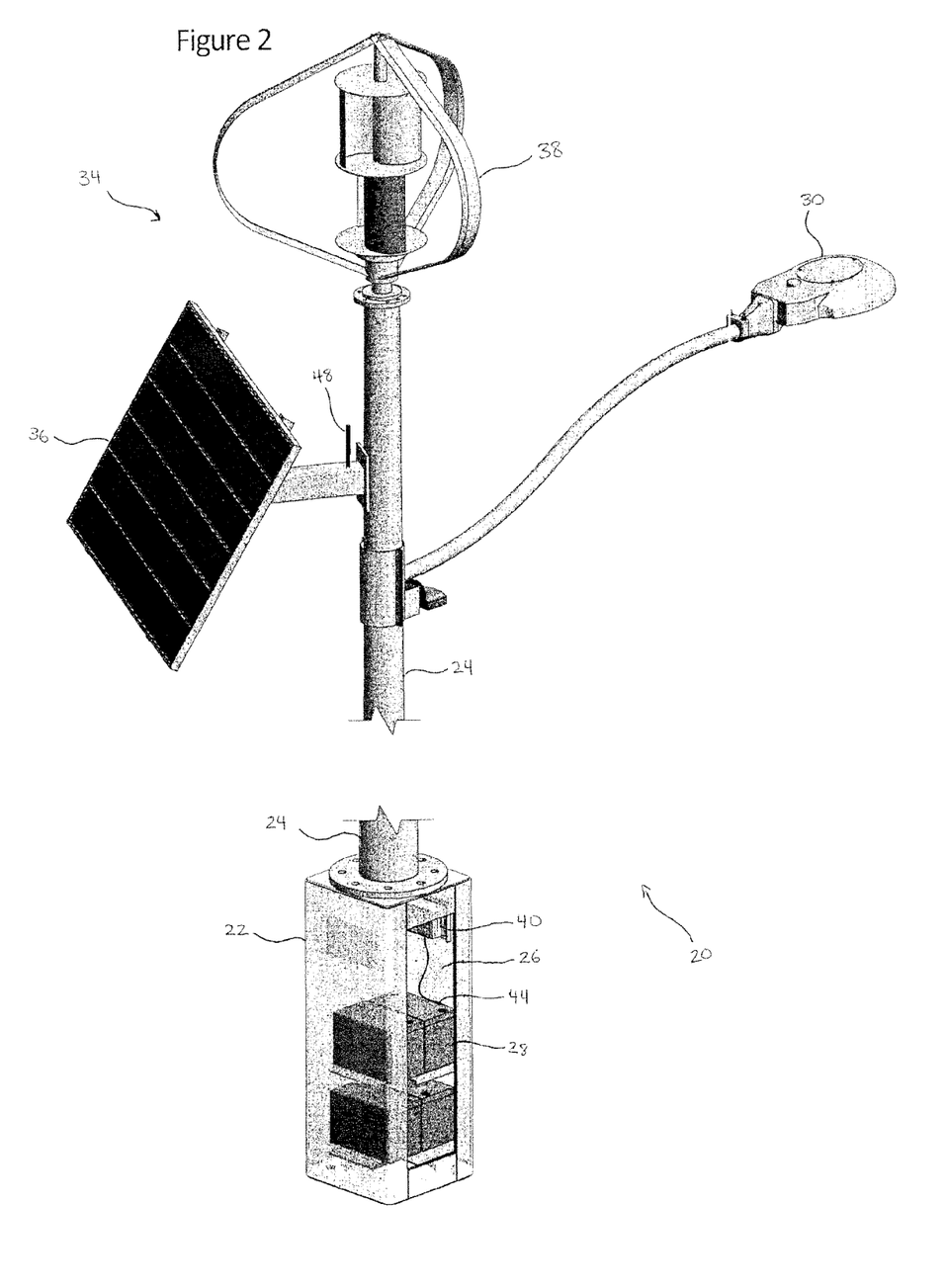
FIG. 2 shows a partial schematic view of a solar light pole used in the installation shown in FIG. 1, in accordance with a preferred embodiment.

In the embodiment shown, the light pole array 12 is illustrated as consisting of a number of autonomously powered light poles 20. The light poles 20 forming each array 12 may optionally include at least one telecommunications aggregator pole, together with a number of conventional poles. FIG. 2 illustrates best, however, each light pole 20 as preferably including a hollow base 22 and an aluminum column 24. As shown best in phantom, the base 22 defines a battery compartment 26 which is used to house a rechargeable battery 28. Preferably, the battery 28 is provided as one or more electrically coupled individual lead acid batteries 28, however, other types of batteries and fuel cells may also be used, including without restriction, single or multiple metal ion batteries, nickel metal hydride batteries, NiCad batteries and other advanced rechargeable batteries.

The column 22 is used to mount above the ground, at least one LED light 30 as an electric load, as well as a low current (typically less than 100 amps) power generation assembly 34 which is used to generate and supply charging electric current to the battery 28. In one preferred construction, the power generation assembly 34 preferably includes both at least one solar or photovoltaic panel 36, and a top mounted wind turbine generator 38. In a conventional light pole application, the power generation assembly 34 is configured to output a maximum peak charging current of approximately 10 to 40 amps, preferably 15 to 30 amps, and most preferably 20 amps, with a minimum duration of 1 second. It is to be appreciated that because of the variable nature of input solar and wind energy, in use, the power generation assembly 34 will typically generate and output charging electric current as a variable current supply.

The battery 28 is configured to receive and store charging electric current which is generated by the power generation assembly 34, and supplies a discharge electric current to the LED lights 30a,30b.

At least one charge controller 40 is provided in either direct electrical communication with the battery 28, or in the case where the battery 28 has an internal battery management system wired or wireless communication. As will be described, the charge controller 40 is operable to sense the level of the depth of electric discharge (DOD) and/or the state of electric charge (SOC) of the battery 28, and further to regulate the flow of charging current from the power generation assembly 34 to the battery 28.

Figure 7:
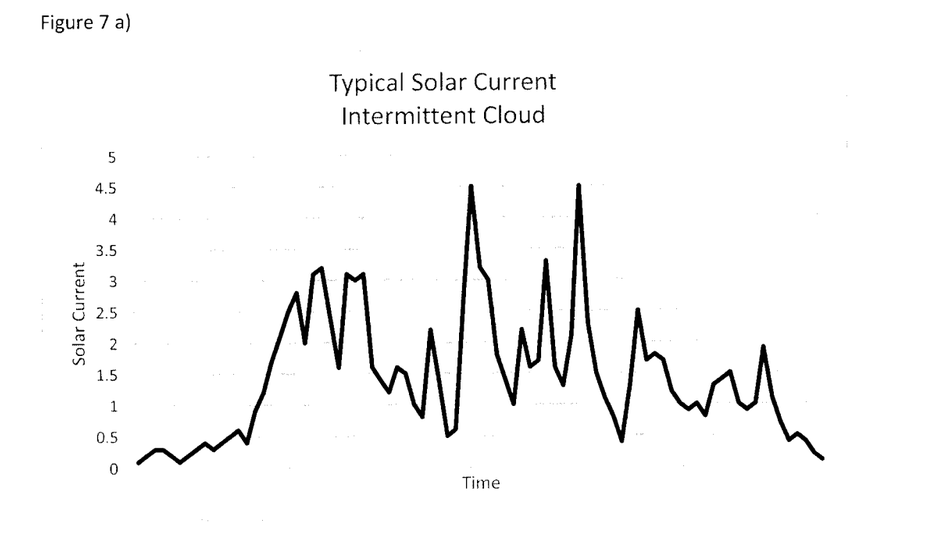
FIG. 7a shows graphically solar power generation variability over a sample charging period characterized by intermittent cloud.
FIG. 7b shows graphically solar power generation variability over a sample charging period characterized by mostly sunny.
FIG. 7c shows graphically wind power generation variability over a sample charging period.

It is to be appreciated, that given the variable nature of input household solar and/or wind energy operating, the power generation assembly 34 typically outputs a charging current to the battery 28 as a variable current. In particular, as a result of changing wind speeds and solar cover, charging current output by the power generation assembly 34 may vary over time ranging from 0 to 30 amps, depending on cloud cover and wind speed. Reference may be had to FIG. 7 which illustrates schematically variability and current output for a typical 200 to 400 w, and preferably a 250 w, rated solar panel.

Optionally, a battery temperature sensor 44 may be housed within the interior battery storage compartment 26, and which is operable to provide data as to the temperature of the battery 28 and/or compartment 26, and as well ambient temperature.

FIG. 2 illustrates best each light pole 20 as further including a data transmission assembly 48. The data transmission assembly 48 is provided in electronic communication with the light 30 or other load, solar panel 36, turbine generator 38 and/or with the charge controller 40, and is operable to both receive therefrom electronic signals indicating the sensed level of DOD and/or SOC of the battery 28, and to transmit such signals to the CPU 14. More preferably, the transmission assembly 48 is configured to receive from the CPU 14 charge controller control signals which are communicated to the controller 40 to control and/or regulate the flow of charging current from the power generation assembly 34 to the battery 28, in response to transmitted output battery DOD and/or SOC and temperature signals.

Most preferably, the data transmission assembly 48 further continuously receives from the battery temperature sensor 44 data indicating the ongoing temperature of the battery 28 and/or compartment 26. The data transmission assembly 48 most preferably substantially continuously or periodically transmits temperature as well as DOD and/or SOC signals to the CPU 14 for input and/or storage in memory.

Reference may be had to FIGS. 3 to 6 which illustrate a preferred method of controlling the charging current from the power generation assembly 34 to the rechargeable battery 28 during a daily charging and nighttime discharging cycle.

Figure 3:
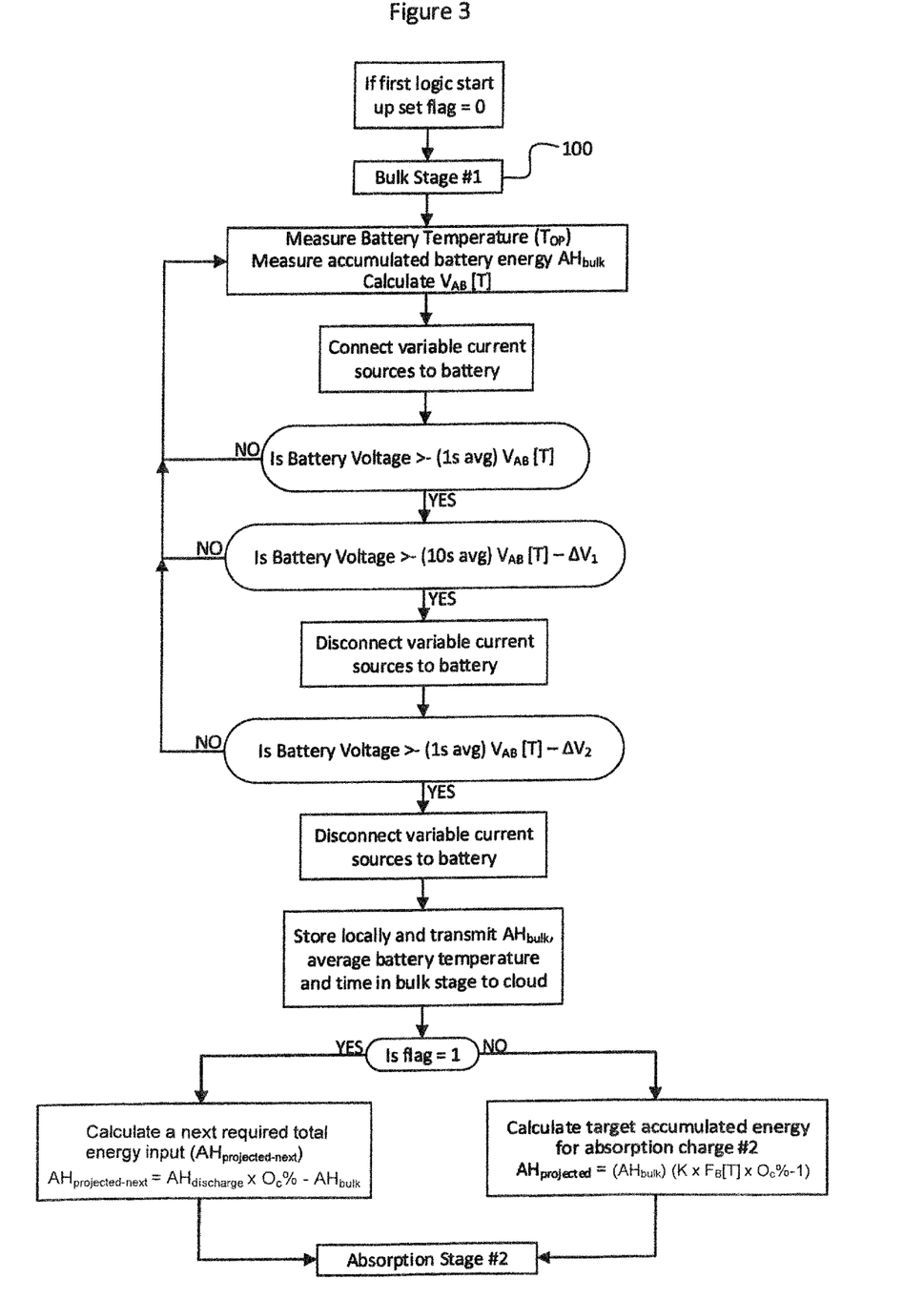
FIG. 3 shows a flow chart illustrating the manner of controlling charging current to the rechargeable battery during a first bulk storage of charging the battery used in the light pole shown in FIG. 2.

In operation of the system 10, initial input baseline values are stored in the CPU memory which are representative of a selected individual light pole battery 28 parameters. Initial input baseline values most preferably include an initial battery capacity factor ($F_B$) for the selected light pole battery 28. The estimated initial battery factor $F_B$ is selected as a value ranging from 50% and 120%, wherein a lowest value of 50% represents a battery chosen as of about the end of its projected working lifespan, with a value of 100% representing a newly installed battery 28 with an anticipated 100% storage capacity. In one simplified calculation, the initial battery capacity factor ($F_B$) is selected as a value in direct linear relationship to the age of the battery having regard to a manufacture's warranted or projected battery lifespan at a target operating temperature. More preferably, a historically observed battery capacity factor ($F_B$) is determined based on the historical temperature, discharge and/or recharge performance of the specific or similar batteries at a particular geographic location.

In addition to the estimated initial battery capacity factor ($F_B$) a preselected battery target voltage ($V_{AB}$), at a given operating temperature ($T_{OP}$) is further input into memory. The battery target voltage ($V_{AB}$) is typically chosen as the manufacturer recommended charging voltage for the individual battery 28, and which is selected to optimize battery performance. It is envisioned that periodically, users update the input baseline values, as for example, to provide a revised battery capacity factor ($F_B$) which reflects battery wear and/or usage, and/or to provide an updated battery target voltage ($V_{AB}$) following battery replacement. Typically, updates to the baseline input values would be effected on a monthly or yearly basis. In a preferred embodiment, updates to such values could be automated by the CPU 14 on a preset time schedule basis.

During daily charging operation of light pole array 12, with the battery 28 installed, an initial battery charging period (100) is undertaken. Typically, primary initial charging occurs with sunrise wherein the CPU 14 is operated to input into memory an initial bulk energy charge ($AH_{bulk}$). The input initial bulk energy charge ($AH_{bulk}$) is selected as representative of the cumulative charging current over time which is required to charge the battery 28 to the preselected battery target voltage ($V_{AB}$).

The CPU 14 next calculates a target energy input ($AH_{projected}$). The target energy input ($AH_{projected}$) is selected as the required charging amperage per period of time for the battery 28 to achieve a 100% state of charge, and wherein the target energy input ($AH_{projected}$) is determined in accordance with the formula:

$$(AH_{projected}) = (AH_{bulk})(K \times F_B[T] \times O_c \% - 1)$$

wherein K is a constant which is selected at between about 1 and 2, and most preferably about 1.5.

$F_B[T]$ represents the originally input estimated initial battery capacity factor, and $O_c$ % selected as a maximum overcharge capacity value.

The $O_C$ % is typically selected at between 100% of total battery charging capacity (with overcharge capacity being nil) and 115% of total battery charging capacity (with overcharge capacity being +15% beyond 100% capacity).

Figure 4:
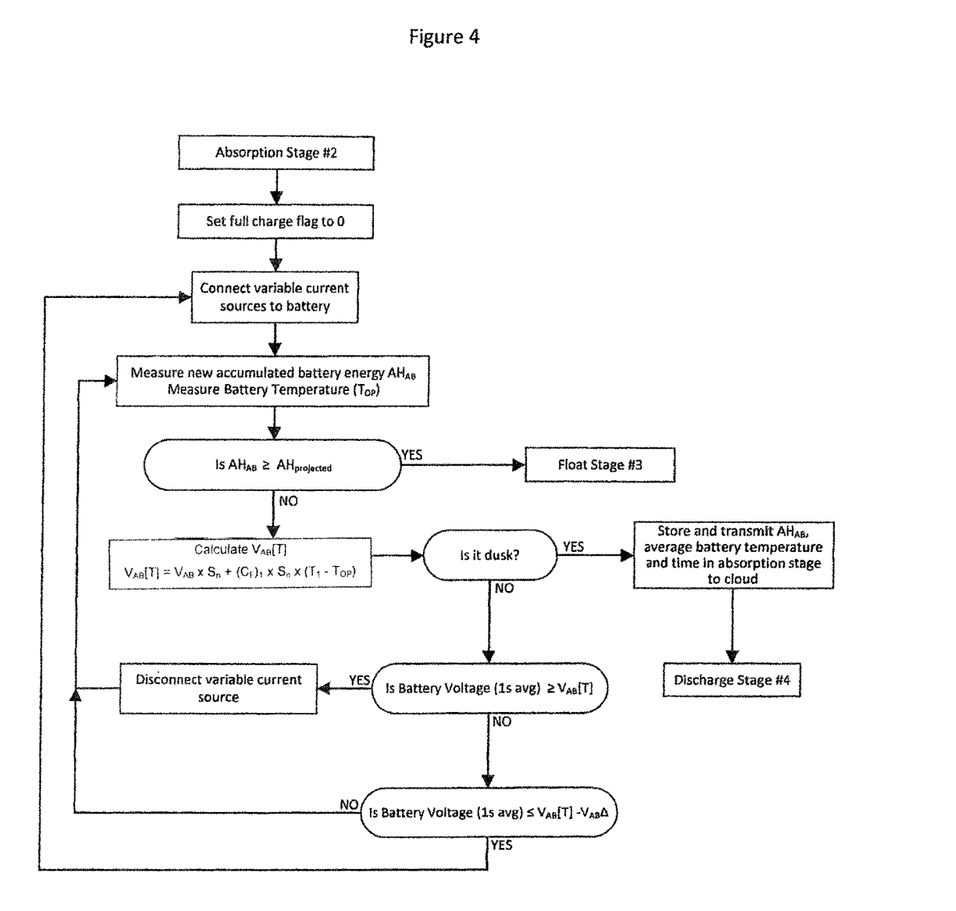
FIG. 4 illustrates a flow chart illustrating the manner of charging current to the rechargeable battery during a second absorption stage battery charging cycle.

As shown in FIG. 4, following the determination of the target energy input ($AH_{projected}$), the CPU 14 is operated to output control signals to the charge controller 40 to effect a second stage charging of battery 28 by the power generation assembly 34. During the second stage charging period, the CPU 14 outputs control signals to the charge controller 40 to regulate the flow of charging current from the power generation assembly 34 to the battery 28 as a first intermittent or pulsed current flow. The first intermittent current flow is characterised by interrupted or sequential charging periods, with periods of current charging supplied by the power generation assembly 34 in a duration chosen to substantially maintain the battery 28 charged at the preselected target voltage ($V_{AB}$) [T], having regard to the sensed temperature ($T_{OP}$) of the battery 28. Most importantly, during off-charging intervals the charge controller 40 operates to sense and detect the actual battery voltage ($V_{BAT}$), as the specific interval.

Once $V_{BAT}$ is found to equal $[V_{AB}]T$, second stage charging commences.

Figure 5:
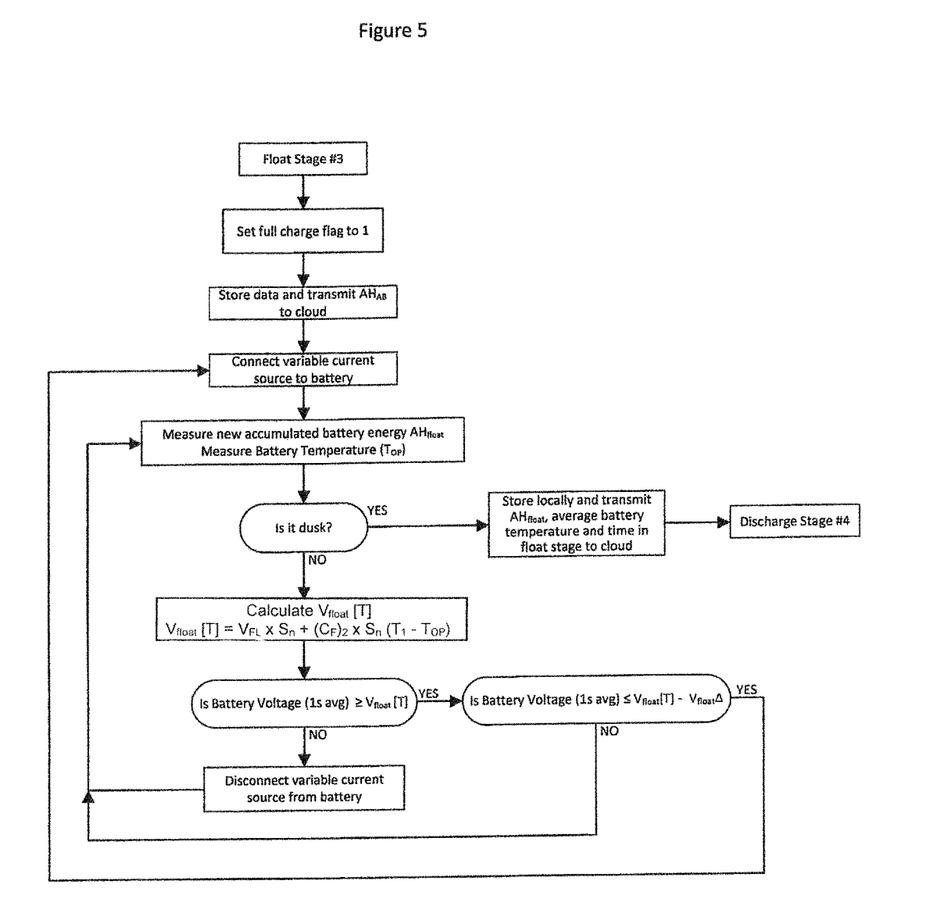
FIG. 5 illustrates a flow chart illustrating the manner of charging current to the rechargeable battery during a third battery float stage charging cycle.

During second stage charging, the CPU 14 processor calculates and inputs into memory, an absorption energy charge ($AH_{Ab}$), calculated as the cumulative charging energy input into the battery 28 up to the point where $AH_{projected}$ is reached When the calculated absorption charge ($AH_{Ab}$) is further determined as equaling the target energy input ($AH_{projected}$), the CPU 14 outputs further control signals to the charge controller 40 to modify the flow of charging current from the power generation assembly 34 to the battery 28 into a second intermittent current flow as shown in FIG. 5. Most preferably, the second intermittent current flow is characterized by a sequential or intermittent current charging periods which are selected to maintain the battery 28 charged at a target float voltage ($V_{float}$) which is selected to maintain the battery at a substantially fully charged state by compensating for any battery self-discharge and/or any parasitic load.

In one preferred embodiment, during second stage charging, the intermittent current flow is provided as a pulsed current flow having a charging pulse frequency selected at between about ¼ second and 10 seconds, and typically 1 to 5 seconds. More preferably, during second stage charging, the CPU 14 is operable to dynamically adjust the battery target voltage ($V_{AB}$) to an adjusted battery target voltage ($V_{AB}$)[T] as a temperature compensated voltage per battery cell in accordance with the formula:

$$V_{AB}[T]=V_{AB}+(C_F)_1 \times (T_1-T_{OP})$$

wherein $C_F$ is a compensating factor which is selected at between −0.001 to −0.1 and most preferably at about −0.004, and $T_1$ Represents selected temperature for the initial target voltage $V_{AB}$.

Figure 6:
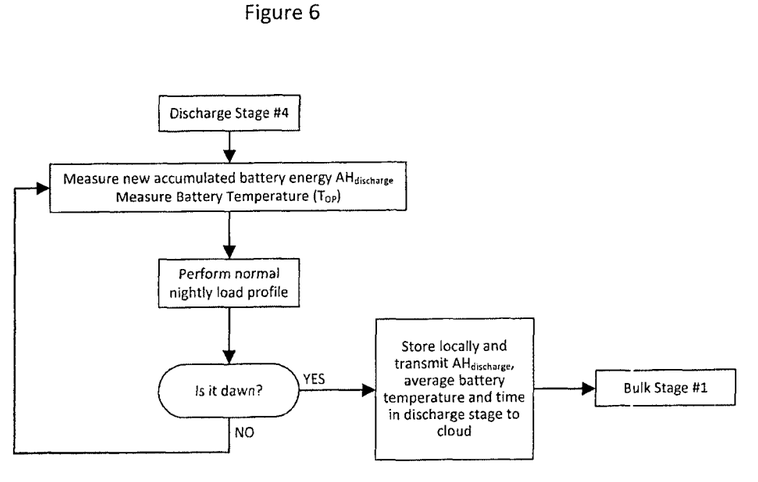
FIG. 6 illustrates a flow chart showing a battery discharge stage under activation of a solar light and/or electrical load.

It is to be appreciated that by reason of the variable nature of input solar and/or wind energy, during battery charging operations, it is conceivable that on overcast and/or calm days, the power generation assembly 34 may fail to provide sufficient energy input into the battery to reach either target energy input ($AH_{projected}$) 100% state of charge during initial charging and/or calculated absorption charge ($AH_{ab}$). In such case, at the end of the charging cycle and which typically occurs at dusk or sunset, the CPU 14 continues to provide output signals to the charge controller 40 to activate the light pole light 30 as an electric load. The charge controller 40 continues during the discharge period to sense the level of the depth of battery discharge (DOD) the charge controller 40 preferably continues to output to the CPU 14 signals representative of the state of battery charging and/or discharge, with the CPU 14 monitoring the amp-hour discharge hour ($AH_{discharge}$) up until the commencement of the next charging period occurring at the next sunrise.

The charge controller 40 is most preferably operable to output to the CPU 14 signals which permit the determination of the total amp-hour discharge ($AH_{discharge}$). The CPU 14 may thus store the amp-hour discharge data in memory, and calculate a next required total energy input ($AH_{projected-next}$) required to either replace the energy discharge from the battery discharge period, or more preferably, where $AH_{projected}$ or $AH_{bulk}$ has not been reached, the total energy input required to achieve a substantially 100% state of battery charge in accordance with the formula:

$$AH_{projected-next}=AH_{discharge} \times Oc\ \%-AH_{bulk}$$

In an alternate mode of operation, during second stage charging of the battery 28, the controller 40 is further operated to verify circuit impedance for integrity and/or degradation. Preferably the controller 40 measures the charging current and whole network voltage measured during on-charging intervals and compares the measured voltage with the battery voltage ($V_{BAT}$) during off-charging intervals according to $$R = \frac{(V\text{ measured} - V_{BAT})}{I_{CHARGE}}$$

wherein $I_{CHARGE}$ represents the current input into the battery 28 during the on-charging interval.

The R value thus represents a connection/wire loss valve for the individual light pole 20. The R value may be then compared against preselected threshold loss values representative of one or more pre-identified fault conditions.

As a further possible embodiment, the system may be operable to sense battery temperatures at discharge or other points of time as a further compensating factor for temperature dependent battery charging capacity charges.

Although the detailed description describes a preferred installation 10 which incorporates an array of solar powered light poles 12 as discrete autonomously powered devices, the invention is not so limited. It is to be appreciated that the present system may equally be applied to a number of different types of autonomously powered devices which incorporate a rechargeable battery and solar and/or wind turbine generator which in use, provide a variable charging power source. By way of non-limiting example, the present system could be used in autonomously powered security/video monitoring stations, weather and/or environmental monitoring stations, highway and/or traffic signs, bike rental installations, parking meters, and telecommunications installations such as cellular power or the like.

While the preferred embodiment of the invention describes the CPU 14 as being located in a region which is geographically remote from the array 12, the invention is not so limited. In an alternate configuration, each of the light poles 20 could be provided with an internally housed, dedicated central processing unit which is adapted to receive either remotely or directly input data representative of the rechargeable battery age. In an alternate construction, the central processor unit could be provided with program instructions to automatically calculate and/or update the battery age following either initial activation of the light pole, or following any battery replacement or substitution.

While the detailed description describes the preferred aspect of the invention as residing in a solar light installation 10, the invention is not so limited. It is to be recognized that the charge controller and method described herein may be used with a number of different types of autonomously powered devices or loads.

In addition, while the preferred aspect describes the charged controller as used to regulate a limited or low current charging flow to battery 28, the present invention is not so limited. It is envisioned that the charge controller and method disclosed herein may also be used to regulate higher current intermittent charging to larger battery storage arrays, which for example are used for whole home off-grid household energy supply or large scale industrial energy storage for use with commercial solar or industrial wind turbine energy production.

Although the detailed description describes and illustrates various preferred embodiments, the invention is not so limited to the best mode which is described. Modifications and variations will now occur to a person skilled in the art. For a definition of the invention, reference may be had to the appended claims.

factor $F_B[T]$ for said battery, and a preselected battery target voltage $V_{AB}[T]$ at a selected operating temperature $(T_{OP})$, wherein as part of a daily charging and discharge cycle the program instructions being operable whereby, during an initial charge period:

A. receiving into said memory an initial bulk energy charge ($AH_{bulk}$) representative of cumulative charging current over time required to charge said battery to said preselected battery target voltage $(V_{AB})[T]$;

B. calculate a target energy input ($AH_{projected}$) selected as a projected required amperage per period of time for said battery to achieve a substantially 100% state of charge, wherein said target energy input ($AH_{projected}$) is determined by the formula:

$$(AH_{project}) = (AH_{bulk})(K \times F_B[T] \times O_c\% - 1)$$

---

$V_{AB}$—is the target absorption voltage for a selected operating temp $T_1$
$V_{float}$—is the target float voltage for a selected operating temp-$T_2$
$C_F$—is the charge factor that adjusts battery voltage according to its operating temperature
$T_{OP}$—is the actual battery operating temp being read via the temperature probe
Absorption Voltage $V_{AB}[T]$—is used to trigger transition from Stage 1 'Bulk Charge' to Stage 2 'Absorption Charge'
$V_{AB}[T] = V_{AB} + CF_1(T_1 - T_{OP})$
Float Voltage $V_F[T]$—is the target battery voltage that the batter is regulated to in the Float Stage #3
$V_{float}[T] = V_{float} + CF_2(T_2 - T_{OP})$
AH—the accumulated battery energy measured by using real time 1 second avg battery current × 1 second/60
$V_{AB}\Delta$—is a selected value to control the reconnect of the input source to charge the batter in the absorption stage
K—is a selected constant that will be adjusted based on battery chemistry and assumed normal daily discharge
$F_B$—is battery capacity factor that reflects the natural change in actual battery capacity during its useful life at a selected operating temperature
$F_B[T]$—is calculated each day by taking $F_B$ and adjusting it for the daily operating temperature conditions
$O_c$ %—defines the level of overcharge energy required to compensate for battery charge inefficiency
$V_{float}\Delta$—is a selected value to control the reconnect of the input source to charge the battery in the float stage
$AH_{discharge}$—is the amount of energy removed from a fully charged battery during the discharge phase of a daily cycle
Flag—is an indicator in the logic to define when the charge algorithm has detected a full battery
$V_{BAT}$—operates to sense and detect the actual battery voltage as the specific interval
$I_{CHARGE}$ is the current input into the battery during the on-charging interval

---

I claim:

1. A solar light or other autonomously powered device assembly comprising:
   solar light pole and/or other load bearing device including,
   a rechargeable battery,
   a light and/or load electrically connected to said battery,
   photovoltaic panel for supplying a charging current to said battery, and
   a charge controller operable to sense a level of a depth of discharge (DOD) and/or a state of charge (SOC) of said battery and regulate or control a flow of charging current from the photovoltaic panel to the battery,
   a processing assembly communicating with said charge controller and operable to receive input signals representative of said sensed level of DOD and/or SOC, and to output in response thereto controller control signals for controlling the flow of said charging current, the processing assembly including memory and program instructions, wherein,
   the memory periodically receiving initial input values representative of an estimated initial battery capacity factor $F_B[T]$ for said battery, and a preselected battery target voltage $V_{AB}[T]$ at a selected operating temperature $(T_{OP})$, wherein as part of a daily charging and discharge cycle the program instructions being operable whereby, during an initial charge period:
   A. receiving into said memory an initial bulk energy charge ($AH_{bulk}$) representative of cumulative charging current over time required to charge said battery to said preselected battery target voltage $(V_{AB})[T]$;
   B. calculate a target energy input ($AH_{projected}$) selected as a projected required amperage per period of time for said battery to achieve a substantially 100% state of charge, wherein said target energy input ($AH_{projected}$) is determined by the formula:

$$(AH_{project}) = (AH_{bulk})(K \times F_B[T] \times O_c\% - 1)$$

wherein K is a constant selected at between about 1 and 2,
   $F_B[T]$ is selected at between 40% to 100%; and
   $O_c$ is a maximum overcharge capacity value selected at between 100% and 120%;
   C. following the initial charging period, the processing assembly outputting control signals to said charge controller to effect a second stage charging period and regulate the flow of said charging current into said battery as a first intermittent current flow, the first intermittent current flow characterized by sequential current charging periods selected to substantially maintain said battery at said preselected battery target voltage $(V_{AB})[T]$ calculating and inputting into said memory an absorption energy charge ($AH_{Ab}$) representative of cumulative charging energy into said battery;
   D. when the cumulative charging energy ($AH_{Ab}$) equals the target energy input ($AH_{projected}$), outputting control signals to said charge controller to regulate the flow of charging current to said battery as a second intermittent current flow, the second intermittent current characterized by sequential current charging periods selected to maintain said charge to said battery at a target voltage ($V_{float}$) selected to substantially maintain the battery at a substantially 100% state of charge.

2. The assembly as claimed in claim 1, wherein the charging current comprises a variable current ranging between about 0 up to 30 amperes.

3. The assembly as claimed in claim 1, wherein the rechargeable battery comprises deep cycle lead acid battery comprising a plurality of cells.

4. The assembly as claimed in claim 1, wherein the estimated initial battery capacity factor is selected at from 50% to 100%.

5. The assembly as claimed in claim 1, wherein the preselected target battery voltage ($V_{AB}$) is selected in the range of about 2.0 to 2.7.

6. The assembly as claimed in claim 1, wherein the first intermittent current flow comprises a pulsed current flow having charging pulse width frequency selected at between about 1 second and 10 seconds.

7. The assembly as claimed in claim 1, wherein during said second stage charging, the processing assembly dynamically selecting an adjusted battery target voltage ($V_{AB}[T]$) per battery cell as a temperature compensated voltage in accordance with the formula:

$$V_{AB}[T] = V_{AB} \times S_n + (C_F)_1 \times S_n \times (T_1 - T_{OP})$$

where $(C_F)_1$ is a compensating factor selected at between −0.001 to −0.01 where $S_n$ represent the number of cells in said battery.

8. The assembly as claimed in claim 1, wherein during charging of said battery with said second intermittent current, substantially outputting to said memory data representative of said battery voltage, temperature, and accumulated AH.

9. The assembly as claimed in claim 1, wherein during said first intermittent current flow, on detecting said pulsed current frequency being less than about 2 seconds, measuring minimum and maximum battery voltages, and outputting control signals indicative of a substantially 100% battery charge condition.

10. The assembly as claimed in claim 1, wherein the initial battery capacity factor ($F_B$) is calculated in a direct linear relation to at least one of an age of the battery and a charging/discharge frequency of said battery.

11. The assembly as claimed in claim 10, wherein the battery capacity factor ($F_B$) further is calculated on a historical discharge and recharge performance of said battery.

12. The assembly as claimed in claim 1, wherein said light pole and/or other load hearing device is disposed in a geographic location remote from said processing assembly, said light pole and/or other load bearing device further comprising a data transmission assembly electronically communicating with said charge controller, the data transmission assembly being operable to transmit said input signals to said processing assembly and for receiving said controller control signals therefrom.

13. The assembly as claimed in claim 12, wherein said data transmission assembly comprises a wireless transmission assembly.

14. The assembly as claimed in claim 4, wherein the light pole and/or other load bearing device further comprises a temperature sensor for sensing an approximate temperature of said battery, said data transmission assembly being operable to transmit data representative or said sensed temperature to said processing assembly.

15. An autonomously powered load or light assembly comprising:

a plurality of loads and/or light poles disposed in an array at first geographic locations, each said load or light pole including,
a rechargeable battery,
a solar light or other load electrically communicating with said battery,
a power generator including at least one of a photovoltaic cell and a wind turbine for supplying a charging current to said battery, said charging current comprising a variable current ranging between 0 and 30 amperes,
a charge controller operable to sense a level of a depth of discharge (DOD) and/or state of charge (SOC) of said battery and regulate or control a flow of charging current from the power generator to the battery,
a processing assembly communicating with said charge controller and operable to receive input signals representative of said sensed level of DOD and/or SOC, and to output in response thereto controller control signals for controlling the flow of said charging current, the processing assembly including memory and program instructions and wherein,
the memory receiving initial input values representative of an estimated initial battery capacity factor $F_B$ for said battery, and
a preselected battery target voltage $V_{AB}$ at a selected operating temperature ($T_{OP}$), during a charge period, the processing assembly operable to:

A. calculate an initial bulk energy charge ($AH_{bulk}$) representative of cumulative charging current over time required to charge said battery to said preselected battery target voltage ($V_{AB}$)[T];

B. calculate a target energy input ($AH_{projected}$) selected as a projected required amperage per period of time for said battery to achieve a substantially 100% state of charge, wherein said target energy input ($AH_{projected}$) is determined by the formula:

$$(AH_{projected}) = (AH_{bulk})(K \times F_B[T] \times O_c\% - 1)$$

wherein K is a constant selected at between about 1 and 2,
$F_B[T]$ is selected at between 40% to 100%, and
$O_c$ is a maximum overcharge capacity value selected at between 100% and 120%;

C. following the initial charging period, the processing assembly outputting control signals to said charge controller to effect a second stage charging period and regulate the flow of said charging current into said battery as a first intermittent current flow, the first intermittent current flow characterized by sequential current charging periods selected to substantially maintain said battery at said preselected battery target voltage ($V_{AB}$)[T]calculating and inputting into said memory an absorption energy charge ($AH_{ab}$) representative of cumulative charging energy into said battery.

16. The assembly as claimed in claim 15, wherein when the cumulative charging energy ($AH_{Ab}$) equals the target energy input ($AH_{projected}$), the processing assembly outputting control signals to said charge controller to regulate the flow of charging current to said battery as a second intermittent current flow, the second intermittent current characterized by sequential current charging periods selected to maintain said charge to said battery at a target float voltage ($V_{float}$) selected to substantially maintain the battery at a substantially 100% state of charge.

17. The assembly as claimed in claim 15, wherein K is selected at between about 1.2 and 1.7.

18. The assembly as claimed in claim 15, wherein if during the initial charge period, $AH_{projected}$ is not reached, during said discharge period the processing assembly sending control signals to said load or light pole to activate said light or other load, and wherein the charge controller being operable to deactivate the light or other load on sensing a predetermined threshold maximum level of battery depth of discharge.

19. The assembly as claimed in claim 15, wherein following said second stage charging, the control processing unit being operable to send control signals to the charge controller to effect monitoring of battery amp-hour discharge ($AH_{discharge}$) up to a next said initial charging period.

20. The assembly as claimed in claim 15, wherein the charge controller being operable to output to the processing assembly, the total said amp-hour discharge ($AH_{discharge}$), the processing assembly operable to calculate a next total energy input ($AH_{projected-next}$) in accordance with:

$$AH_{projected-next} = AH_{discharge} \times O_c \% - AH_{bulk}.$$

* * * * *